P. KENNEDY.
CHARGING STORAGE BATTERIES.
APPLICATION FILED MAR. 17, 1908.
1,019,482.
Patented Mar. 5, 1912.
4 SHEETS—SHEET 2.
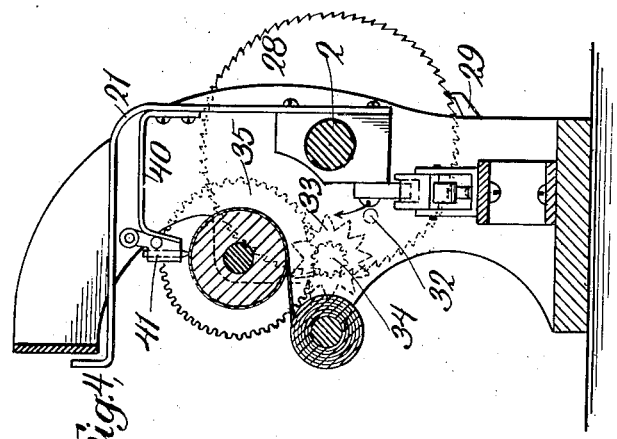
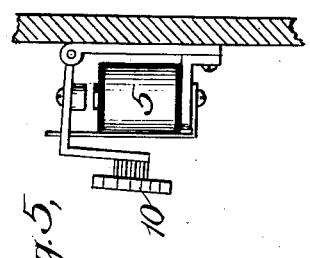
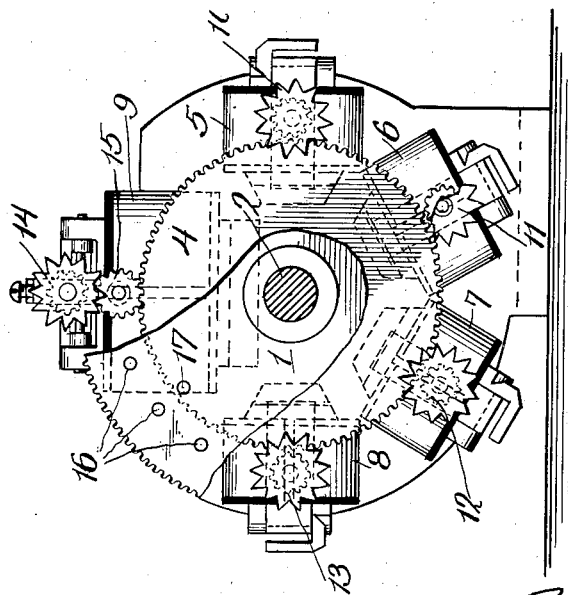
WITNESSES:
INVENTOR
Patrick Kennedy
BY
ATTORNEYS

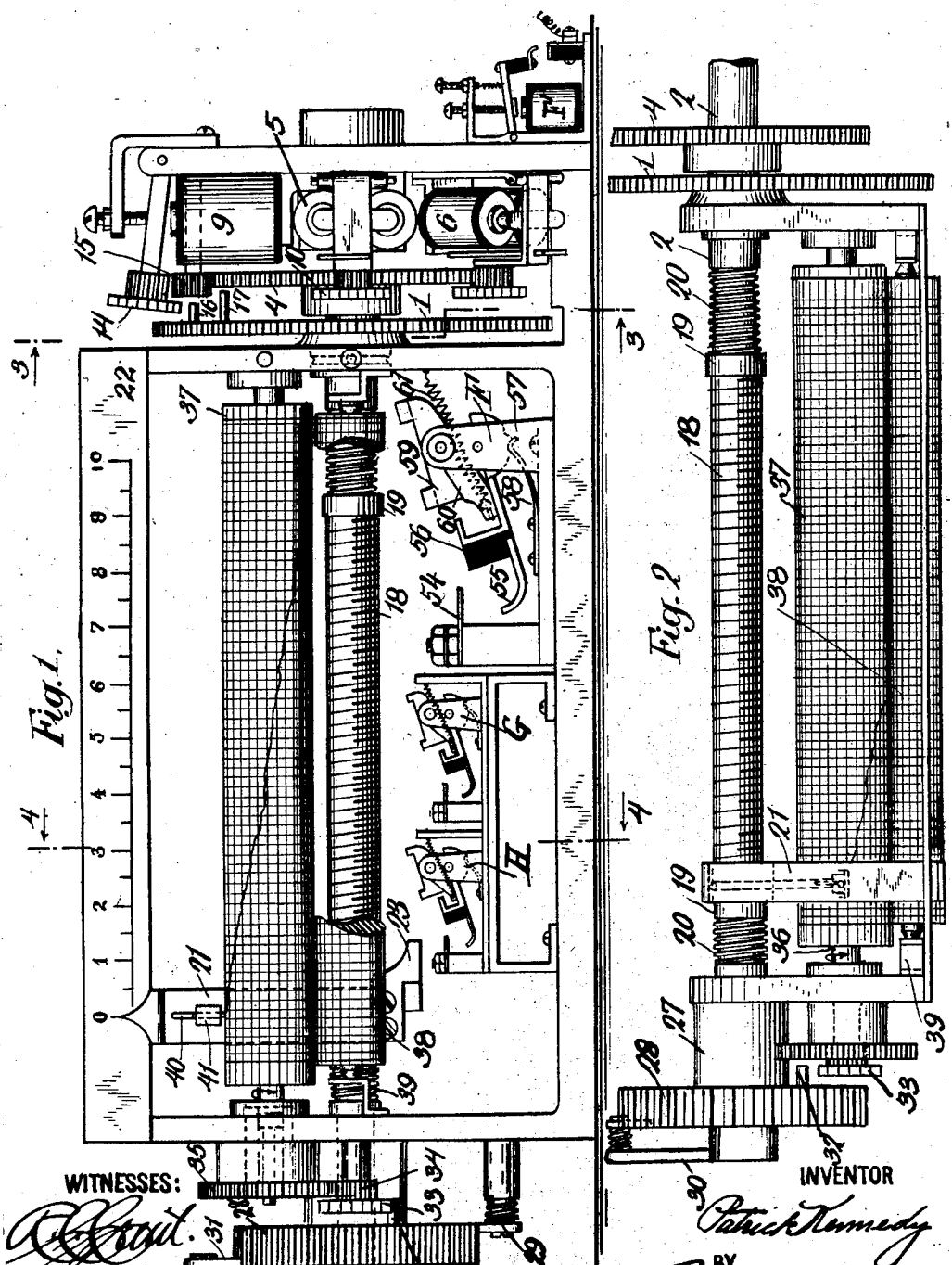

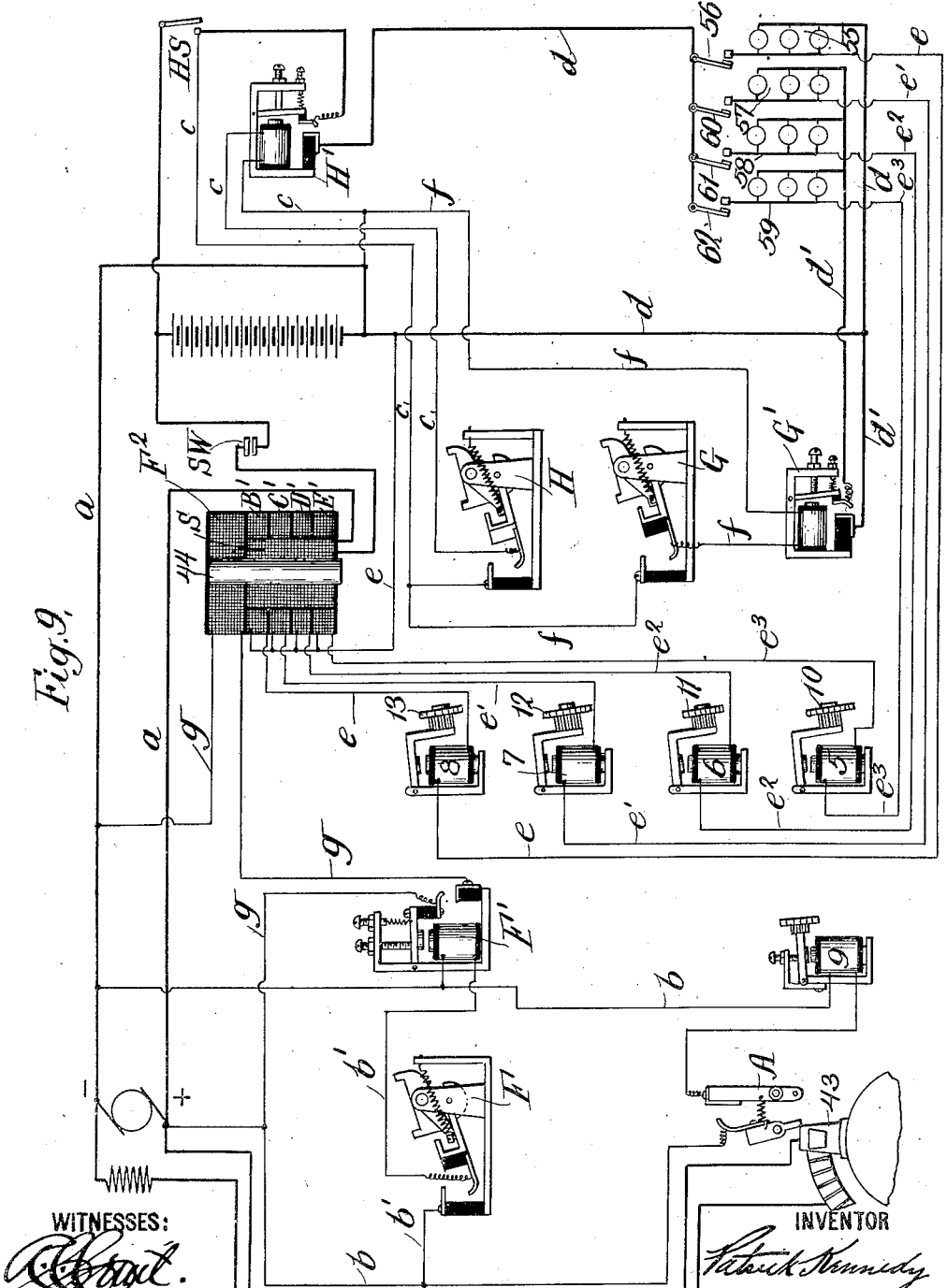

P. KENNEDY.
CHARGING STORAGE BATTERIES.
APPLICATION FILED MAR. 17, 1908.
1,019,482.
Patented Mar. 5, 1912.
4 SHEETS—SHEET 4.
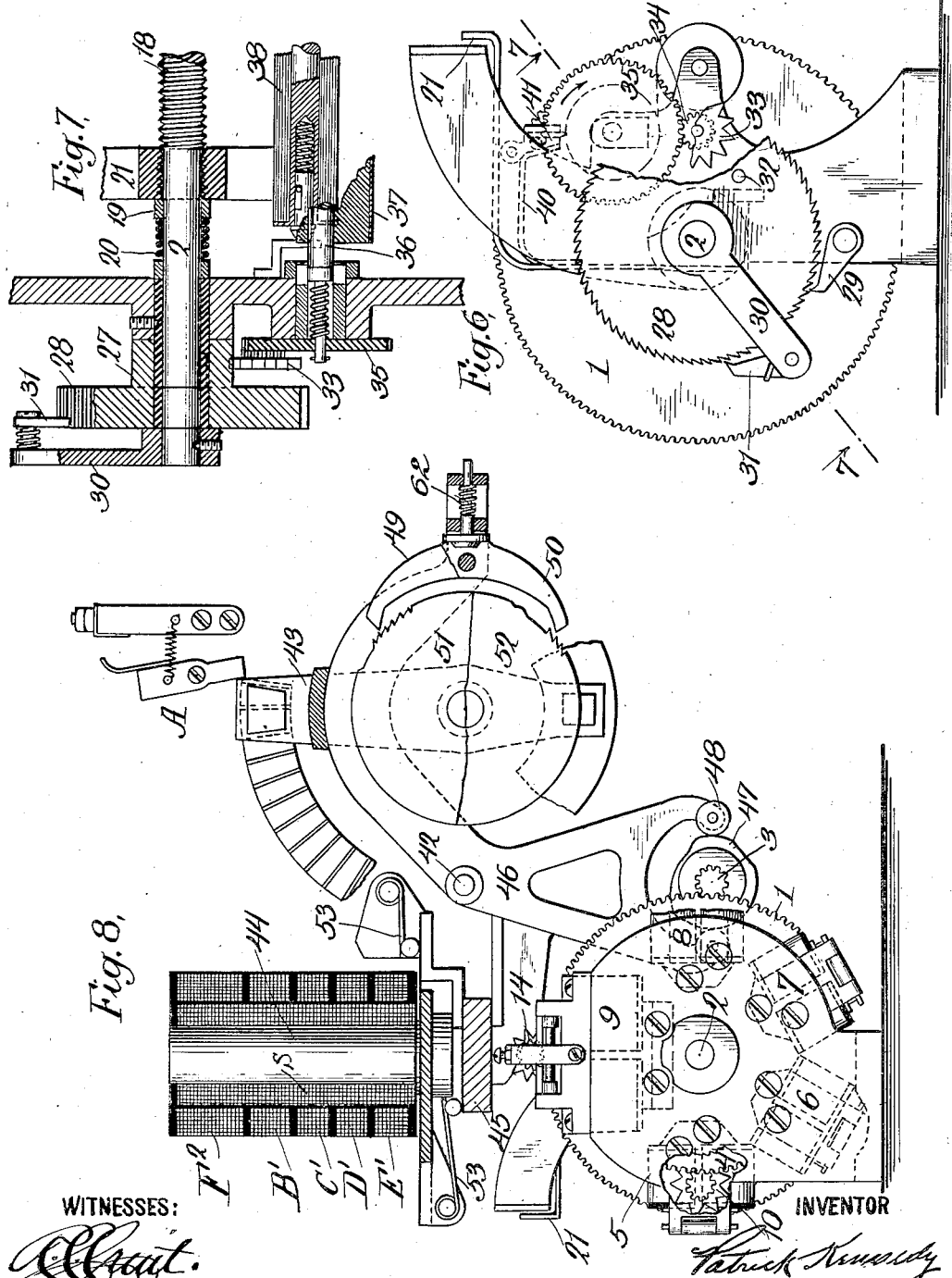

UNITED STATES PATENT OFFICE.

PATRICK KENNEDY, OF BROOKLYN, NEW YORK.

CHARGING STORAGE BATTERIES.

1,019,482.  Specification of Letters Patent.  Patented Mar. 5, 1912.

Application filed March 17, 1908. Serial No. 421,662.

*To all whom it may concern:*

Be it known that I, PATRICK KENNEDY, a citizen of the United States, residing at Brooklyn, in the county of Kings and State of New York, have invented certain new and useful Improvements in Charging Storage Batteries; and I do hereby declare the following to be a full, clear, and exact description of the invention, such as will enable others skilled in the art to which it appertains to make and use the same.

The invention relates primarily to an improved method of charging storage batteries so as to insure that the battery shall be automatically recharged to its full capacity, or preferably slightly over-charged, and yet which shall prevent an excessive overcharge.

The invention is of peculiar value in connection with train-lighting systems in which the storage battery is charged from a generator driven from the axle of the moving vehicle, so that the generator is constantly driven when the vehicle is in motion and is not driven when the vehicle is at rest.

In railway car lighting, various means have been proposed to prevent an overcharge of the storage battery. These systems which have been most widely used in practice are (a) the system in which the generator is regulated to produce an electro-motive force of constant value, so that the battery is charged at constant potential, and as the electro-motive force of the battery rises it opposes that of the generator, thereby preventing an over-charge; (b) the system in which there is inserted between the generator and the battery a circuit breaker which is operated to cut off the charging current whenever the potential across the battery terminals reaches a predetermined maximum. These systems, which embody regulation by potential at the battery terminals, are objectionable for the reason that this potential is subject to wide variation from causes which are independent of the actual amount of charge stored in the battery. The potential which must be supplied at the battery terminals by the generator is equal to the electromotive force of the battery plus its internal resistance drop which is equal to the internal resistance of the battery multiplied by the current flowing through it. If then a battery is being charged from a constant voltage supply, as in the first system above mentioned, any increase in its internal resistance cuts down the value of the charging current, and the battery therefore fails to receive its proper charge. So also, if the duration of charge of a battery under constant-current conditions is governed by the value of the applied electro-motive force, as in the second system above mentioned, any marked rise of the internal resistance of the battery, requiring as it does an increase of the electro-motive force to maintain a constant value of charging current, will open the potential-controlled circuit-breaker and cut off the charging current before the battery has received the full charge. The internal resistance of storage batteries is, however, subject to wide variations due to variations in temperature; in the quantity and density of the electrolyte; in the condition of plates and connections, etc., and consequently such systems of charge are quite unreliable.

Although the theoretical disadvantages of over-charging a storage battery are perhaps frequently exaggerated, yet it is a fact that, as a practical matter, there are certain marked disadvantages in such an overcharge, particularly in train-lighting systems. Among these disadvantages may be mentioned the useless expenditure of energy, and the rapid decomposition of the water in the electrolyte, which if not properly compensated for will allow a portion of the plates to become dry, with the result that the parts of the negative plates which are exposed to the air are destroyed, and the specific gravity of the electrolyte rapidly increases, both of these effects necessitating frequent inspection and correction in order to maintain normal conditions. Furthermore the long-continued over-charge may increase the process of "formation" especially in a Planté element, and thereby materially shorten the life of the elements. It is, therefore, highly desirable, as a practical thing, that some means should be provided for preventing a long-continued over-charge of the battery. It is, however, equally, or even more, desirable that the battery should always be recharged to its full capacity, to compensate for the discharge and to maintain the battery in condition to perform its intended functions whenever called upon to do so. Indeed, it is desirable that the storage battery should always be slightly overcharged to compensate for known effects, such as leakage. It is the aim of my invention to accomplish this automatically without requiring the attention of experienced manual labor, which is frequently not available, particularly in car-lighting systems in which the energy is supplied from a generator driven from the car axle: In such systems each car to be lighted is provided with a generator, a storage battery, and some means for regulating or controlling the output of the generator at all the varying speeds above the critical, that is, above the speed at which the generator output is sufficient to warrant its connection to the storage battery.

There are a number of well known devices for so regulating the output of such generators, among which may be mentioned; devices for regulating the tension of the driving belt, so that the belt will slip when the output exceeds a predetermined limit; devices for automatically varying the field current to compensate for the speed variations; a compound reverse winding on the field of the generator to compensate for such variation; and the use of a so-called "bucker" in connection with the generator to cause a variation in the field current in inverse proportion to the speed variation. These various devices may be used to regulate the generator to a constant potential, or to a constant current, according to their adjustment. These devices have served to take care of the variation of speed of the generator in a satisfactory manner, but they all leave much to be desired in the practical operation and handling of the system, particularly as regards the control of the storage battery, and the determination of its conditions of charge.

One of the greatest difficulties heretofore encountered in the practical use of storage batteries (where they are not continuously under the immediate supervision of experienced engineers who may keep accurate records of charge and discharge), is the difficulty of determining the condition of charge of the battery. Among the methods employed for determining such conditions may be mentioned; the inspection of the electrolyte and the plates, which cannot well be taken advantage of in train-lighting systems, or in other systems where access to the batteries is difficult; the volt-meter test, which owing to the variations in the internal condition of the battery is not at all accurate and is practically worthless on open circuit; and the hydrometer test, which necessitates a knowledge of the specific gravity of the electrolyte before charging, and a comparison of that with the specific gravity at the moment of observation. This latter test is not satisfactory where the batteries are not continuously under the observation of the tester, because of the possibility that new electrolyte has been added to the battery by some other attendant; and the test is not accurate because the condition of the specific gravity of the electrolyte varies with the atmospheric conditions, which vary the rate of evaporation of the electrolyte. It is, therefore, highly desirable that some means should be provided for determining, at least approximately, the condition of charge of the battery at any time, which means should be capable of easy observation and reading, and should preferably be automatically controlled, and may advantageously include a permanent record.

It is the object of my invention to provide a system of charging storage batteries in which the batteries are automatically recharged to their full capacity, regardless of the variations in the internal conditions thereof, and the consequent variations in the potential of the generator, and yet one in which a long-continued over-charge of the battery is automatically prevented.

It is a further specific object of the invention to provide an index, capable of being easily read, and which is automatically actuated to show approximately at least the condition of charge of the battery.

Furthermore, and particularly in connection with train-lighting systems, there is frequently a liability to an over-discharge of the battery which results in an injurious deposit upon, or sulfatation of the battery plates. It is a further object of my invention to automatically prevent such over-discharge.

In the drawings I have illustrated the best form of apparatus now known to me in which the invention may be embodied, and for purposes of illustration I have shown this apparatus as used in connection with the regulating apparatus for car-lighting systems disclosed in my prior Patents Nos. 745,194, of November 24, 1903; and 800,114, of September 19, 1905, though the utility of the invention is in no wise limited to that particular regulating means, but, on the contrary, any of the other known regulating means above mentioned, or their equivalents, may be used.

In the drawings, Figure 1 is a front elevation of the indicating, recording and controlling means. Fig. 2 is a top plan view thereof. Fig. 3 is a section on line 3—3 of Fig. 1. Fig. 4 is a section on a line 4—4 of Fig. 1. Fig. 5 is a detail of one of the controlling magnets of the device. Fig. 6 is an end elevation of the apparatus shown in Fig. 1, looking toward the right. Fig. 7 is a fragmentary section on the line 7—7 of Fig. 6. Fig. 8 is an end elevation of the other end of the apparatus shown in Fig. 1, parts being removed to add to the clearness of illustration, and showing the connection of the device to the regulator of my earlier patents, and Fig. 9 is a diagram of the circuit connections.

The gear wheel 1 is mounted to rotate loosely on the shaft 2 and is driven through the pinion 3 (see Fig. 8) from any suitable source. In the particular instance shown in the drawings, this pinion is mounted on the cam shaft of the regulator of my earlier patents above mentioned, and is arranged to be driven continuously by the regular motor whenever the lamps are turned on or whenever the generator has attained sufficient speed to be connected to the feeding circuit. That is to say, this motor operates whenever the generator is supplying current either to the battery or to the lamps, and whenever the battery is supplying current to the lamps, whether the generator is running or not. It will be understood, of course, that any other driving source may be utilized, provided that it is either continuously driving the pinion, or is always driving it when the generator is feeding current to the battery or to the lamps, and also when the battery is feeding current to the lamps, whether the generator is running or not. Splined to the shaft 2 is a second gear wheel 4 about which are arranged the magnets 5, 6, 7, 8 and 9, which control the position of the star-wheels 10, 11, 12, 13 and 14, to each of which is connected a pinion. The pinions of the star-wheels 10, 11, 12 and 13 are so placed that they will mesh with the gear wheel 4 when the magnets are excited, but when the magnets are not excited the pinions are held out of mesh by suitable springs. The pinion of the star-wheel 14 meshes with an idler 15 when the magnet 9 is excited, and is held out of mesh by a suitable spring when that magnet is not excited. Upon the face of the gear wheel 1 are three pins 16, adapted to strike and turn the star-wheel 14 when the magnet 9 is excited, thereby driving the gear wheel 4 and the shaft 2 in one direction. The face of the gear wheel 1 also carries a single pin 17 which is longer than the pins 16 and is adapted to strike and turn any one of the star-wheels 10, 11, 12 or 13 which has been brought by its magnet into such a position that its pinion gears with the wheel 4, to thereby turn the gear wheel in a reverse direction. On the shaft 2 is a worm 18 and at each end thereof a loose collar 19 pressed against the end of the worm by the spring 20. Traveling on the worm is a pointer 21, the upper end of which serves to indicate on the scale 22 the number of hours during which the battery has been charged, and the lower end of which carries a projection 23 adapted to close in turn the snap switches H, G and F as the pointer moves from left to right, or to open those switches in turn as the pointer moves from right to left. On the other end of the shaft 2 outside of the supporting frame-work is loosely mounted a sleeve 27 carrying a ratchet 28 which has a pawl 29 supported from the supporting frame and arranged to prevent a turning of the ratchet 28 in a counter-clockwise direction as viewed in Fig. 6. Fixed to the extreme end of the shaft 2 is an arm 30 carrying a second pawl 31 arranged to slide over the ratchet in a counter-clockwise direction as viewed in Fig. 6, and to turn the ratchet in a clockwise direction as viewed in that figure. On the face of pinion 28 is a pin 32 arranged to strike the star-wheel 33 mounted for rotation on a stub shaft supported on the frame. This stub shaft carries a pinion 34 which meshes with the gear 35 on the end of the shaft 36 of the main paper reel 37 which is arranged in conjunction with a reserve paper reel 38 mounted in suitable bearings 39 in the frame. The mechanical operation of these parts is as follows: Unless the magnets 5, 6, 7, 8 and 9, or some of them, are excited, the gear wheel 1 rotates freely without affecting the indicating mechanism. As soon, however, as any one of those magnets is excited the corresponding pinion is brought into mesh and the corresponding star-wheel is actuated by the pins 16 or 17, as the case may be, to turn the gear 4 and the shaft 2. The star wheel of magnet 9 causes rotation in a direction to move the pointer 21 to the right to indicate a charge, and the star wheels of magnets 5, 6, 7 and 8 cause a rotation in the other direction to move the pointer to the left to indicate a discharge. Mounted on the pointer by a flexible support 40 is a stylus 41. When the shaft 2 rotates in a direction to indicate a charge the paper reel 37 is not rotated and the record line is straight, but when the rotation is in a direction to indicate a discharge the ratchet 28 is rotated to rotate the paper reel and the record line is correspondingly altered.

The regulating device of my earlier patents in connection with which my present invention is illustrated, is one in which the regulation is effected by inserting resistance in the field magnet circuit of the generator to reduce its current output. This insertion of resistance is effected by the mechanism illustrated in a fragmentary way in Fig. 8 of the drawing, in which the rheostat arm 43 controls the resistance of the field magnet circuit of the generator. The rheostat arm is controlled by the magnet 44, which carries a main winding S in series with the generator, a series of individual coils B′, C′, D′ and E′ which are in shunt to the individual lamp switches and are wound in such a direction as to oppose the effect of the series coils S, and a coil F², which is in shunt to the generator circuit, is wound in a direction to assist the effect of the series coil S, but does not become effective until the battery is fully charged, as will be further explained. The armature 45 of the magnet is carried by the lever 46 which is pivoted to a stationary support at 42. When the lever is in the normal position (seen in Fig. 8), the cam 47, which is on the shaft of the motor above mentioned, rotates between two rollers 48 on the lever 46 without actuating the lever sufficiently to cause the pawls 49 and 50 to engage the ratchets 51 and 52, which are reversely arranged and attached to the rheostat arm 43. The attraction of the magnet is opposed by the two springs 53, and under the normal conditions the effect of the springs is balanced by the pull of the magnet to maintain the parts in the inactive position shown, so that although the cam is rotating between the wheels 48 it does not move the rheostat arm. If the magnet is weakened, the armature is depressed, turning the lever 46 on its pivot and lifting its outer end carrying the pawls 49 and 50. When this occurs the pawl 50 pressed by spring 62 is brought into engagement with the ratchet 52, and thereupon the rocking of the lever turns the rheostat arm in a direction to cut resistance out of the field magnet circuit. If the magnet 44 is strengthened, the armature is attracted and the pivoted pawl 49 becomes effective to cut resistance into the field magnet circuit.

Referring again to Fig. 1, it will be observed that the switches F, G, and H are snap switches of similar construction, and a detailed description of one will suffice for all of them. Thus referring to the switch F, the spring contact plate 54 and the bent piece 55 constitute the terminals of the circuit. The spring plate 54 is mounted on a suitable standard provided with an ordinary binding screw and the piece 55 is carried by the movable arm 56 of the switch, which is pivoted in the standards 57 and provided with the latch spring 58 to hold it in set positions. The actuating member of the switch is the striker 59, which is pivoted in the upper portions of the standards 57 and has an extended finger 60 to which is connected the spring 61, the other end of which is connected to a fixed support. As the projection 23 on the pointer 21 moves to the right, it turns the striker 59 on its pivot until the finger 60 has engaged the turned over portion of the arm 56, and lifted the piece 55 to such an extent that the spring 61 begins to act above the pivotal center of the striker 59, whereupon the switch snaps into the circuit-closing position. The circuit-opening action is the reverse of that just described and will readily be understood.

Having thus described the mechanical operation of the separate parts employed, we are in a position, upon referring to the diagram of circuit connections (Fig. 9), to understand the operation of the charging system as a whole, assuming that the battery is entirely discharged, and the generator is at rest, in which case all of the parts will be in the positions shown in the drawings, with all of the magnets 5, 6, 7, 8 and 9 inert so that their respective star wheels and pinions will be ineffective. Upon starting the generator no current flows in the main charging circuit until the automatic switch SW is closed. This switch is arranged to close automatically when the generated electromotive force has risen sufficiently to warrant the connection of the generator to the charging circuit. This may be accomplished in various ways, well known to electrical engineers, as, for example, in the manner described in my earlier patents above mentioned. Upon the closing of this switch current will flow from the positive terminal of the generator through circuit $a$, through the series coil S on the magnet 44, through the battery to charge it, and back to the negative terminal of the generator, all the other circuits being open, as shown.

The capacity of the generator is so chosen that as the train, or other driving power, speeds up, current in the coil S almost immediately rises sufficiently to cause magnet 44 to begin to cut resistance into the field circuit of the generator. As soon as this movement has started, switch A (see Fig. 8) is released by rheostat arm 43 and allowed to close, whereupon current flows from the generator through circuit $b$ and magnet 9, exciting that magnet and bringing its star wheel and pinion into operative position. Whereupon the rotation of the gear wheel 1, as above described, begins to turn worm 18 in a direction to move pointer 21 with its projection 23 to the right. When this charging of the battery has been continued long enough to establish in the battery a suitable minimum charge, switch H is closed by projection 23, thereby closing circuit $c$ containing the magnet of switch H' and constituting a shunt on the main charging circuit from the hand switch HS, which ordinarily remains closed, to a point on the negative side of the battery. The current flowing through this shunt closes switch H' to supply current to the emergency bank of lamps 55 through circuit $d$ and hand switch 56 which should also ordinarily be closed. The closing of this circuit also allows current to flow through shunt circuit $e$ to magnet 8, and through coil B' on magnet 44. This brings star wheel 13 and its pinion into operative position, causing a reverse rotation of the worm 18 to indicate a discharge. It also weakens magnet 44 and causes it to cut out resistance from the field magnet circuit of the generator, thereby increasing the flow of current from the generator.

For practical purposes I have found it advantageous to so adjust the parts that the amount of resistance cut out from the field magnet circuit will allow an increase of the current flow equal to about one-third of the current taken by the lamps. For example, the storage battery may ordinarily be supplied, when all the lamps are cut out, with a current of about thirty amperes. If then we suppose that the emergency bank of lamps takes ten amperes, the adjusting will be such that enough resistance will be cut out of the field magnet circuit to increase the current flow to 33⅓ amperes, of which ten amperes will flow to the lamps and 23⅓ to the battery. It will be observed, however, that whereas worm 18, in this condition of the parts continues to be given three advance turns by star wheel 14, it will be given but one reverse turn by star wheel 13, so that its indication of charge is two thirds of what it was before, which in this particular example equals 20 amperes, whereas, as a matter of fact, the actual charge to the batteries—twenty-three and one-third amperes—is somewhat in excess of two thirds of the normal charge of 30 amperes. It would, of course, be possible to so adjust the parts that the advance of the worm would be correspondingly in excess of two thirds of what it was before, but it is preferable to adjust the parts in the manner indicated so that the actual charge is slightly in excess of that indicated. In other words, the reverse movement of the pointer is slightly diminished so that the battery will actually be charged to a slightly greater amount or for a longer period of time figured on a thirty ampere-hour basis than that indicated. This course is adopted for the following reasons: (a) It is primarily intended that the pointer 21 should indicate approximately the number of ampere-hours available in the battery for lighting the lamps. The numbers on the scale indicate the hours figured on a basis of, say, thirty amperes, or whatever convenient number is adopted. It is a fact, however, that the output capacity of a battery falls below the energy which has been expended in charging it by a percentage which is fairly constant and ranges around twelve per cent. One object then of indicating less than the actual ampere-hours of charge is to make up for this loss; (b) it is also true that the effective value of the charging current varies to some extent on account of the internal condition of the battery, temperature, etc., and there is a certain loss in the battery from leakage, etc., all of which things tend to diminish the effective charge below what it would be under theoretically perfect conditions. Moreover, a slight overcharge of the battery, or an indication of slightly less charge than the battery actually contains, is to be preferred to an under-charge or excessive indication, under practical conditions. Another object, then, of indicating less than the actual ampere-hours of charge is to allow for these variations and insure that the battery shall certainly be capable of giving the indicated output; and rather more than less.

A further effect of the action thus far described is that the reverse movement of the worm 18 will have turned the pinion 28 and thereby the paper roll 37, so that a diagonal line on the record strip will indicate how long and to what extent the lamps have burned. As the pointer moves farther to the right it will close the switch G, preferably when the battery has been charged to about half its capacity. This allows a current to flow through the circuit $f$ and the magnet of switch G', thereby closing that switch and putting the banks of lamps 57, 58 and 59 in condition to have their circuits closed through the circuit $d'$, when the hand switches 60, 61 and 62 are closed, to light their respective banks of lamps. When these switches are closed the circuits $e'$, $e^2$ and $e^3$ are completed through the respective magnets 7, 6 and 5 to bring their star wheels 12, 11 and 10 with their pinions into operative position, and to close the circuits of coils C', D' and E' on the magnet 44. The effect in each case is the same as the effect of closing the circuit $e$, so that when the lamps 57 are lighted the worm 18 is given two reverse steps to three advance steps; when the additional lamps 58 are lighted, the worm is given three reverse steps to three advance steps; and when all of the lamps are lighted the worm is given four reverse steps to three advance steps. It will be understood that the lamps may be divided into any desired number of banks, with a corresponding number of controlled magnets and coils on the magnet 44, four being shown here merely as indicating a satisfactory practical application. It will also be understood that in each case the battery is really receiving somewhat more current than is indicated by the pointer, for the reasons above set forth. If the train slows down sufficiently to open the automatic switch SW, or if for any other reason the generator ceases to supply current to the charging circuit, and if then any or all of the lamps continue in use, the pointer will continue to indicate the discharge from the battery to the lamps, and the magnet 9 will become inert so that there will be no indication of charge to the battery.

After the charging of the battery has continued until the cumulative indications of the pointer show a charge of the maximum number of hours which it is desired to charge the battery, say, ten hours, the switch F will be closed by projection 23 and this will close circuit $b'$, containing the magnet of switch F'. This circuit $b'$ is in shunt to the charging circuit, so that the current carried by it is proportional to the voltage on that circuit. It results from this, that after the battery charge has continued for the maximum number of hours desired, the closure of switch F will act to close switch F' provided the voltage on the charging circuit is up to the point at which magnet F' is set to operate; this magnet being designed to operate when the voltage has reached a point which indicates a full charge on the battery, so far as exact indication in that way is possible. If the voltage has not reached that point, the charging of the battery will continue, and the hub of pointer 21 will be run off of the worm 18, advancing collar 19 and compressing spring 20, whereupon a continued turning of worm 18 will not further advance the pointer. If, however, the voltage on the charging circuit has reached the predetermined point when the switch F is closed by projection 23, or whenever after switch F is closed the voltage reaches that point, switch F' will close, thereby closing circuit $g$ and exciting coil $F^2$, which, as before described, is wound in a direction to strengthen magnet 44, and will, therefore, act to cut resistance into the field magnet circuit of the generator, and cut down the current flow, preferably to a point where a small maintaining current of two to four amperes flows into the batteries, to make up for leakage and the like. If now the discharge of the battery begins again the hub of pointer 21 will be forced on to worm 18 by spring 20, to continue its indications.

If the discharge continues long enough pointer 21 will be moved back until, when there is only an indicated charge of about five hours in the battery, switch G will be opened automatically, thereby cutting out the banks of lamps controlled by that switch, and compelling a conservation of the remaining charge in the battery by limiting its use to the emergency bank of lamps. Upon a further reduction of the battery charge to a point where only the desired minimum charge remains in the battery an indicated charge of about 1.8 hours on the 30 ampere basis has been established in practice as a satisfactory point the switch H will be opened automatically to cut out the emergency bank of lamps, thereby absolutely preventing an over-discharge of the battery. The switches G and H may, of course, be set in any desired position with respect to the scale to open and close at any desired period of charge. Indeed, they may be omitted entirely without affecting the operation of the other parts, in which case a continued discharge would ultimately run the hub of pointer 21 off the left-hand end of worm 18, and the attendants would have to be relied upon to prevent an over-discharge.

It will be seen, then, that my system provides for so regulating the output of the generator that it will charge the battery under constant current conditions, regardless of the electro-motive force of the battery (including in that term its internal resistance drop) for a predetermined time period; and that after that predetermined period of charge has elapsed the charging circuit to the battery will be automatically opened if, or when, the voltage of the charging circuit has reached a predetermined point. This prevents an excessive overcharge, and at the same time insures that the battery shall always be fully recharged. The system may also provide for automatically opening the battery circuit when its charge has fallen to a predetermined point, to thereby prevent an over-discharge; and more specifically it may provide for conserving the charge of the battery when it has fallen below a certain point by automatically cutting out all of the lamps except those on the emergency bank.

The instrumentalities above described also provide an easily read indicator which always shows approximately the number of ampere-hours of charge in the battery and may indeed be made to show that exactly, though I prefer, for the reasons stated, to so arrange the parts that the indication will always be slightly less than the actual charge. The devices furthermore provide a permanent record of the battery charge and the discharge to the lamps.

As I have already pointed out, the switch F' is preferably effective to cut down the current flowing to the battery to such an extent as to allow only a small maintaining current to flow, to make up for the current losses in the battery. The purpose of this maintaining current is to make up for losses in the battery, and the amount which is permitted to flow may vary from zero to a current of substantial value, depending upon the conditions of operation.

The question of just how much current shall be allowed to continue to flow is one which may be left to the judgment of the engineer, though I have preferred a maintaining current of two to five amperes under ordinary conditions. In any event, the difference between the charging current and the maintaining current is actually a difference in kind rather than a difference in degree, since the charging current is sufficient to create the evil effects above mentioned, while the maintaining current should be so small as to avoid those evil effects. It will thus be understood that when I specify in the following claims that the charging current is discontinued, I mean to distinguish it from the maintaining current and to include within the scope of the claims the cutting down of the current to such an extent as to discontinue the charging current, and avoid the evils resulting from an overcharge whether any maintaining current continues to flow to the battery or not.

What I claim is:—

1. The method of charging storage batteries which consists in supplying a charging current to the storage battery for a predetermined number of ampere hours regardless of the electromotive force of the battery, and thereafter causing a predetermined maximum potential difference across the battery terminals to discontinue the charging current, substantially as described.

2. The method of charging storage batteries, which consists in supplying a charging current of substantially constant value to the storage battery for a predetermined number of ampere hours regardless of the electromotive force of the battery, and thereafter causing a predetermined maximum potential difference across the battery terminals to discontinue the charging current, substantially as described.

3. In a train-lighting system, a generator driven from the car axle, a storage battery connected to said generator to be charged thereby, and mechanism for regulating the generator to a constant-current output, in combination with a controlling device in said circuit which discontinues the charging current when the potential thereof reaches a predetermined limit, and mechanism for rendering the controlling device inoperative until the battery has been charged to a predetermined number of ampere-hours; substantially as described.

4. In a train-lighting system, a generator driven from the car axle, a storage battery connected to said generator to be charged thereby, and mechanism for regulating the generator to a constant-current output, in combination with a movable indicator for showing the number of ampere-hours to which the battery has been charged, a controlling device in the charging circuit adapted to discontinue the charging current when the potential thereof reaches a predetermined limit, and mechanism for rendering the controlling device inoperative which is actuated to allow the controlling device to operate when the movable indicator reaches a predetermined position; substantially as described.

5. In a train-lighting system, a generator driven from the car axle, a storage battery connected to said generator to be charged thereby, and mechanism for regulating the generator to a constant-current output, in combination with a movable indicator for showing the number of ampere-hours to which the battery has been charged, a controlling device in the charging circuit adapted to discontinue the charging current when the potential thereof reaches a predetermined limit, mechanism for rendering the controlling device inoperative which is actuated to allow the controlling device to operate when the movable indicator reaches a predetermined position; and a device for making a permanent record associated with the indicator; substantially as described.

6. In a device for indicating the charge supplied to a storage battery, a worm, an indicator driven thereby, a gear wheel attached to said worm for driving it, a series of electro-magnets arranged about the gear wheel, a star wheel and pinion connected to the armature of each electro-magnet in such a position that when the magnet is excited the pinion is brought into mesh with the gear wheel, a series of lamps divided into banks, connections for supplying current from each of said banks to one of said electro-magnets when the lamps in that bank are burning, an additional magnet in proximity to the said gear wheel, a star wheel and pinion connected to the armature of said magnet, a gear meshed with said gear-wheel, and adapted, when said additional magnet is excited, to mesh also with the last-named pinion, connections for supplying current to said additional magnet whenever the batteries are receiving current, and mechanism for intermittently striking each of the star wheels which is in such position that its pinion meshes with the gear wheel, whereby the worm is rotated in one direction to indicate the charge and in the other direction to indicate the discharge; substantially as described.

7. In a train lighting system, a generator driven from the car axle, a storage battery connected to said generator to be charged thereby, a traveler, mechanism responsive to the current flowing in the battery circuit to move the traveler a distance proportional to the charge in the battery, a circuit-controlling device actuated by said traveler when it reaches a predetermined position, a second circuit-controlling device responsive to the difference of potential across the battery terminals, and mechanism for discontinuing the flow of charging current to the battery when said circuit-controlling devices are both closed, substantially as described.

8. In a system for charging storage batteries, a generator, a supply circuit extending therefrom, a storage battery and translating devices connected across said circuit in combination with mechanism for controlling the battery charge comprising a worm, mechanism responsive to current flowing in the charging circuit and adapted to drive the worm in one direction when the battery is being charged and in the other direction when the battery is being discharged, a traveller on the worm, a switch operated by said traveler when it reaches a predetermined position, and mechanism controlled by said switch and adapted to discontinue the charging current to the battery without discontinuing the supply of current from the generator to the translating devices, substantially as described.

9. An indicating device for use in connection with systems for charging storage batteries, comprising a worm 18, a pointer 21 driven thereby, a gear wheel 4 secured to the shaft of the worm, a series of magnets arranged about said gear and adapted to be excited to indicate a discharge from the battery, a star wheel and pinion secured to the armature of each magnet and adapted, when the magnet is excited to mesh with the gear wheel 4, an additional magnet 9 in proximity to the gear wheel and arranged to be excited when the battery is being charged, a star wheel 14 and pinion carried by the armature of said magnet, an idler pinion meshing with the said gear wheel, with which the pinion on the armature of the magnet 9 is adapted to mesh when that magnet is excited, a driven gear wheel 1, a series of pins 16 arranged to strike the star wheel 14 when it is in the meshing position, and a pin 17 arranged to strike the star wheels of the first mentioned series of magnets when they are in the meshing position, whereby the indicator is moved in one direction to indicate a charge and in the other direction to indicate a discharge; substantially as described.

10. In an indicating and controlling device for use in connection with systems for charging storage batteries, a worm 18, a pointer 21 driven thereby, a gear wheel 4 secured to the shaft of the worm, a series of magnets arranged about said gear and adapted to be excited to indicate a discharge from the battery, a star wheel and pinion secured to the armature of each magnet and adapted, when the magnet is excited, to mesh with the gear wheel 4, an additional magnet 9 in proximity to the gear wheel and arranged to be excited when the battery is being charged, a star wheel 14 and pinion carried by the armature of 65 said magnet, an idler pinion meshing with the said gear wheel, with which the pinion on the armature of the magnet 9 is adapted to mesh when that magnet is excited, a driven gear wheel 1, a series of pins 16 arranged to strike the star wheel 14 when it is in meshing position, and a pin 17 arranged to strike the star wheels of the first mentioned series of magnets when they are in the meshing position, whereby the indicator is moved in one direction to indicate a charge and in the other direction to indicate a discharge, and a switch F actuated by the pointer when it reaches a predetermined position to control the charging circuit; substantially as described.

11. An indicating device for use in connection with systems for charging storage batteries, comprising a worm 18, a pointer 21 driven thereby, a gear wheel 4 secured to the shaft of the worm, a series of magnets arranged about said gear and adapted to be excited to indicate a discharge from the battery, a star wheel and pinion secured to the armature of each magnet and adapted, when the magnet is excited, to mesh with the gear wheel 4, an additional magnet 9 in proximity to the gear wheel and arranged to be excited when the battery is being charged, a star wheel 14 and pinion carried by the armature of said magnet, an idler pinion meshing with the said gear wheel, with which the pinion on the armature of the magnet 9 is adapted to mesh when that magnet is excited, a driven gear wheel 1, a series of pins 16 arranged to strike the star wheel 14 when it is in the meshing position, and a pin 17 arranged to strike the star wheels of the first mentioned series of magnets when they are in the meshing position; whereby the indicator is moved in one direction to indicate a charge and in the other direction to indicate a discharge, and a spring-pressed collar 20 at the end of the worm, whereby the pointer may run out of engagement with the worm and be thereby brought to rest; substantially as described.

12. In a train lighting system, a storage battery, lamps fed therefrom, and mechanism for automatically cutting out a portion of the lamps to conserve the battery charge when said charge falls below a predetermined point, substantially as described.

13. In a train-lighting system, a generator driven from the car axle, a storage battery charged thereby, a movable indicator automatically actuated to show the amount of charge, an over-charge switch F actuated by the indicator when it reaches the position indicating the maximum charge desired, an under-charge switch H actuated by the indicator when it reaches a position indicating the lowest point to which it is desirable to discharge the battery, and an intermediate switch G actuated by the indicator in an intermediate position; substantially as described.

14. In a train lighting system, a storage battery, lamps fed therefrom, mechanism for automatically cutting out a portion of the lamps when the battery charge falls below a predetermined point, whereby the battery charge is conserved, and mechanism for automatically cutting out the remainder of the lamps when the battery charge falls below a predetermined lower point, whereby excessive discharge of the battery is prevented, substantially as described.

In testimony whereof I affix my signature, in presence of two witnesses.

PATRICK KENNEDY.

Witnesses:
 AUG. TREADWELL, Jr.,
 WALTER E. GREEN.